Patented May 25, 1948

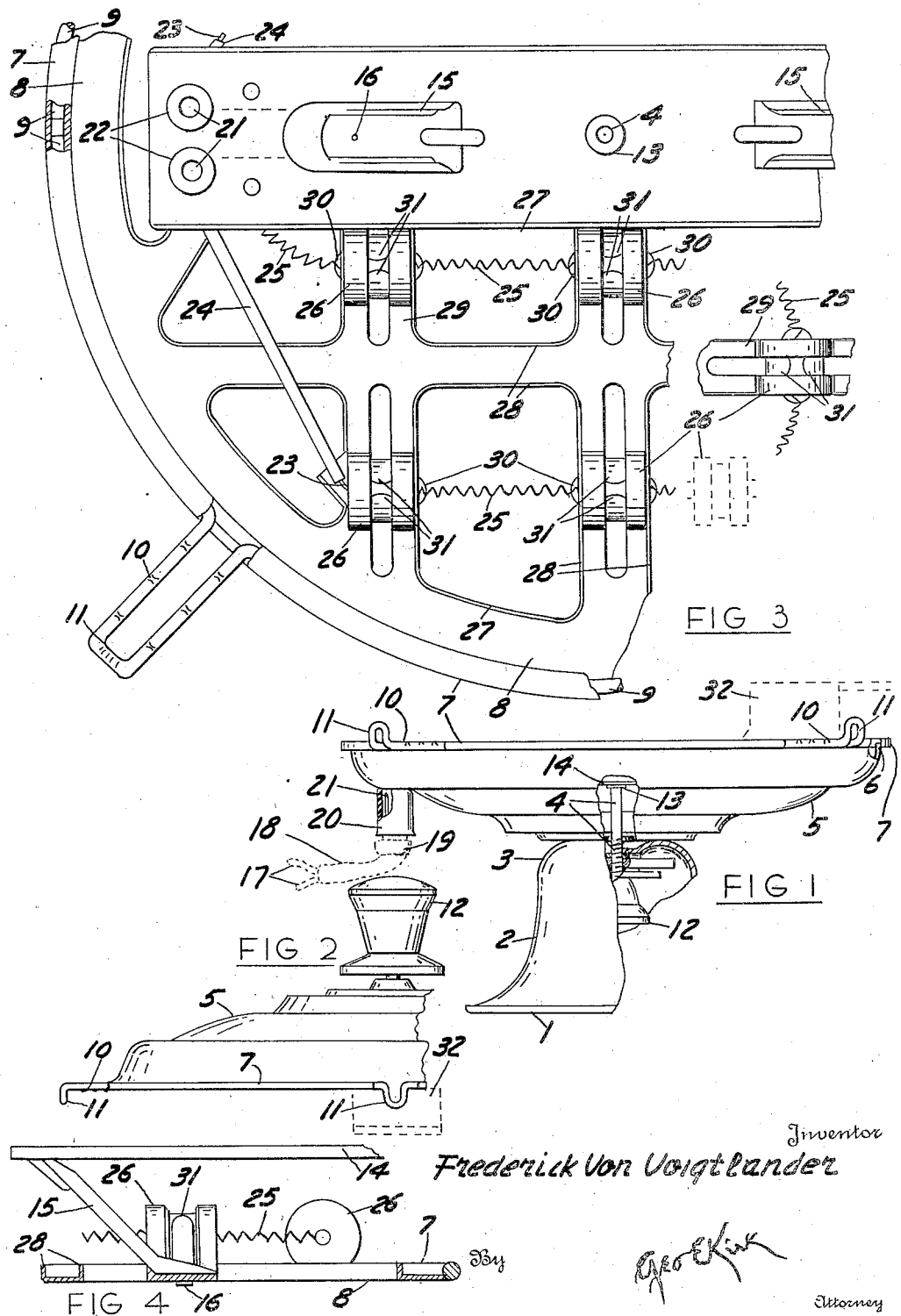

2,442,253

UNITED STATES PATENT OFFICE 2,442,253

MULTIPLE PURPOSE ELECTRIC COOKER

Frederick Von Voigtlander, Grass Lake Township, Jackson County, Mich., assignor, by mesne assignments, to Sperti Faraday Inc., a corporation of Ohio Application April 1, 1946, Serial No. 658,608

2 Claims. (Cl. 219—37)

1

This invention relates to a multiple purpose mounting for an electric cooker and the advantages arising therefrom.

This invention has utility as a household appliance, more particularly when supported, as a broiler, and as a support of the general hot-plate type, as for boiling, toasting, frying, or general cooking.

Referring to the drawings:

Fig. 1 is a side elevation, with a portion of the base broken away, having the unit set up as a support, to serve as a hot-plate;

Fig. 2 is a side elevation, of a portion of the unit of Fig. 1, oriented, and thus in position for broiling and such like operations;

Fig. 3 is an enlarged view of the heating element and its mounting, of somewhat over one-quarter, in bottom plan, when in the position of Fig. 1; and Fig. 4 is a side elevation of a portion of the transverse mounting bar with the open-work or grid carrier for the heating element, this view being from the right portion of the showing in Fig. 3 and looking upward.

The general exterior structure

Bottom rim or flange 1 is from a dome or bell-shaped base. The base 2 rises to a top 3 (Fig. 1). Thru an opening axially of the top 3, there extends an externally screw threaded stem 4 projecting from a central opening in a down-stepped housing or pan 5. Concentrically with the stem 4, the housing 5 has an upstanding rim 6. The rim 6 nests just within a bead 7 of an openwork carrier 8. The perimeter of the carrier 8, as carrying the bead 7 has therein a reinforcing wire 9. The wire 9, at four equally spaced regions, has ribbed or stepped radiating arm portions 10 ending in upstanding loops or return bends 11.

Assembly of the carrier 8, housing 5, and the base 2, is had by a knob or nut 12 upon the projecting stem 4 in the base 2. The stem 4 has a rivet connection 13 (Fig. 3) with an intermediate plate or bar 14. The bar 14 has slant tongue portions 15 pitched toward the carrier 8. Rivet connections 16 assemble the bar 14 and the carrier 8 a unit. Tightening of the knob nut 12 draws the rim 6 into register for snugly seating within the bead 7. There is thus provided a substantial support for the unit, say in hot-plate position.

The electrical connections

Electric current supply stranded wire conductors 17 are in a flexible conduit 18 to a socket providing terminal fitting 19. The fitting 19 may be thrust into a cup 20 to engage conductor terminal prongs 21 in insulation bosses 22. On the side of the bar or plate 14, the terminals 21 toward

2 the grid carrier 8, have conductor leads 23 in insulation tubes 24 of the pipe-stem type. The leads 23 are connected by a helical electric resistance heater 25 extending axially thru insulator spools 26 in a general back and forth course to span openings 27 of the carrier 8.

The openings 27 are bordered by slight flanges 28 toward the plane of the bar 14, thus providing reinforcing means for giving rigidity to the thin gage sheet metal carrier 8. Insulation spool supporting and directing channels 29 are supplemental holding means for the respective spools 26, with flange offset or distortion portions 30 at the location means for the spools. Furthermore, the web of the carrier 8 between the flanges 28, has tongue portions 31. The tongue portions 31 extend from the web at the sides of the spools in the channels. The free ends of the tongues 31 are wrapped upon the reduced diameter mid or central portion of the spools 26. The threading of the helical heater element or resistor 25 is quickly accomplished with the definite location of the heater by the spools, all in a light weight substantial unit.

The flexible connection thru the conduit 18 permits of convenient placing of the utensil upon a table, sink, or as desired, about a kitchen or breakfast room. The flare 1 of the bell base 2 is a stubstantial support for exposing the heater 25 for upward or reverse service, as to act upon foodstuffs in a skillet or frying pan 32 (Fig. 1).

For primary service, that is with the heater grid open downwardly, the bell 2 may be left in position. However, it is believed there is more convenience in removing the bell 2 and attaching the knob 12 directly to the inverted pan 5, thru the stem 4. In this downwardly directed use, the open top of the skillet or frying pan 32 (Fig. 2) may be covered by the unit as a lid. The stepped or ribbed arms 10 serve to centralize the utensil with which this heating tool is to cooperate. The hooks or loops 11 may coact on, against or in the cooperating vessel.

The bounding rib or bead 7 has a snug slip-fit coaction with the rim 6 in locating the pan or housing 5, whether below as a shield, or in the oriented position as a cover.

The threaded means 4 fixed with the bar 14 may locate the top 3 of the base 2 as a washer, when the nut of the knob 12 effects the assembly.

The general exterior structure is readily severable for cleaning or other upkeep care. Removal of the knob 12, if the base 2 be thereon, is thus a release for the base. Whether or not the base 2 be used, taking the knob 12 off the stem 4, allows the pan or cover 5 to be moved clear of the heater assembly. The electrical elements are thus fully exposed for checking, or any special attention required therefor.

What is claimed and it is desired to secure by Letters Patent is:

1. An electric cooker comprising, a heater element, insulation spools thru which the element extends, a foraminous sheet metal support provided with engaging means for locating the spools in spaced relation, said support having a circular bounding bead, and a reinforcing wire in the bead provided with outwardly extending loop sections forming positioning means for the heater or objects rested thereon.

2. An electric cooker comprising apertured insulation means, a resistor extending thru said insulation means, an openwork support for said insulation means, a bar rigidly connected to the support and spaced therefrom to locate the resistor between the bar and support to form a unit, a pan adapted to envelope the unit, a base adapted to abut the pan, and a knob having thread assembly with the bar and adapted to removably assemble the pan and base selectively with the unit.

FREDERICK VON VOIGTLANDER.

REFERENCES CITED

The following references are of record in the file of this patent:

UNITED STATES PATENTS

| Number | Name | Date |
|---|---|---|
| 1,550,979 | McInnes | Aug. 25, 1925 |
| 1,563,453 | Sutherland | Dec. 1, 1925 |
| 1,628,875 | Ehrgott | May 17, 1927 |
| 2,269,480 | Rehm | Jan. 13, 1942 |